June 4, 1957 N. S. REYNOLDS 2,794,662

SEAL WITH SIDE ACTING SPRING

Filed July 2, 1953

INVENTOR.
Noel S. Reynolds

BY

ATTORNEY

United States Patent Office 2,794,662
Patented June 4, 1957

2,794,662
SEAL WITH SIDE ACTING SPRING

Noel S. Reynolds, St. Louis, Mo., assignor, by mesne assignments, to Federal-Mogul-Bower Bearings, Inc., Detroit, Mich., a corporation of Michigan Application July 2, 1953, Serial No. 365,703

13 Claims. (Cl. 288—3)

This invention relates to seals and more particularly seals for use between relatively rotatable members to seal off movement of fluid.

One of the objects is to produce an improved seal of the kind referred to in which the sealing lip or edge which engages a rotating member such as a shaft is maintained in sealing engagement as a result of a compressing action on a flowable sealing material of which the lip is a part, such as rubber, synthetic rubber or the like.

Another object is to embody in the kind of seal above referred to a floating action between the relatively rotating members to thereby allow for the lip to follow any eccentric movement of one member relative to the other.

Yet another object of my invention is to produce an improved floating seal in which the sealing edge or lip of the seal has associated therewith a hard surface bearing member for riding on a rotating member such as a shaft and thereby cause the sealing edge or lip to follow the shaft movement without change in pressure thereon and result in non-uniform wear caused by the eccentric movement.

A further object is to produce a seal for a shaft or like rotatable member in which the sealing element is a thin washer of flowable material such as rubber, synthetic rubber or the like and the sealing action is maintained by the application of an axial compression force on the sides of the washer.

A further object is to produce an improved seal having a sealing member of thin yieldable and flowable material with a sealing lip adjacent a bearing member therefor for riding on a shaft, and means for maintaining a sealing force for the lip by a compressing force acting on the side of the material and with the bearing member acting as a backing and against which the force is applied.

Yet another object is to produce a seal which has a sealing lip engageable with a shaft and maintained by compression between two members of a flowable and yieldable material, such as rubber or the like, and wherein the two members will act as shaft bearing means on opposite sides of the lip so that the lip will always have substantially uniform sealing action on the shaft, notwithstanding the shaft may have eccentric movement with respect to the fixed member, as a casing, in which it is mounted, or notwithstanding the lip may have wear.

Still a further object is to produce improved structure for mounting a seal in a casing or other structure by a "press in" action that is easily accomplished and when accomplished the seal will have a sealed fit with a minimum possibility of the yieldable material, such as rubber or synthetic rubber, taking a "set."

Other objects of my invention will become apparent from the following description taken in connection with the accompanying drawings in which.

Figure 1:
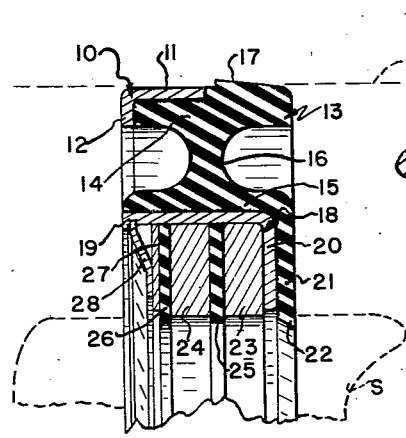
Figure 1 is a radial section view through an annular seal structure having embodied therein my invention.
Figure 2:
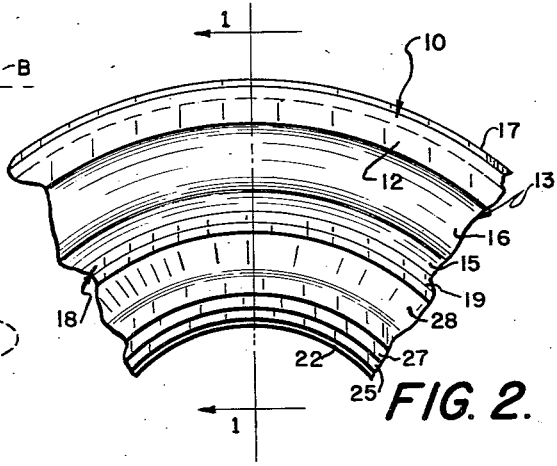
Figure 2 is a side view of a segment of the seal shown in Figure 1.

Referring to the drawings in detail and first to Figures 1 and 2 which are a radial sectional view and a side view of a segment of an annular seal, it will be noted this seal, shown by way of example as embodying my invention, is especially designed for association with a shaft and a bearing supporting housing. The seal has a metal support ring 10 of L-shaped cross section with one leg 11 cylindrical and the other leg 12 as an inwardly extending flange. To this support ring is bonded an annular rubber member 13 which will act as a flexible web for the seal. The web member has an outer portion 14 of considerable width and an inner portion 15 also of considerable width with the two portions connected by a relatively thin portion 16. The outer portion is about twice the width of the support ring cylinder and the part not attached to the support ring has a beveled peripheral surface 17, the angle of bevel being around 5 degrees with the axis of the seal. The greatest diameter of this beveled surface is adjacent the support ring and extends radially outwardly beyond the ring. When the seal is to be mounted in a bore, indicated by the dashed line B, of a housing the support ring will have a snug fit in the bore and the beveled surface will be pushed inwardly and the rubber caused to flow. The result will be an easily pressed in seal having a good sealing action with the bore. The beveled surface facilitates the easy press in mounting of the seal.

The inner portion 15 of the rubber web member 13 is bonded to an annular metal ring 18. This ring is also L-shaped in cross section having a cylindrical leg 19 and an inwardly extending flange leg 20. The flange 20 is on the side opposite the supporting ring of the seal which will be the inner side of the seal. The rubber web member 13 is not only bonded to the cylindrical leg 19, but also has an integral portion 21 extending down alongside the surface of the flange 20 and bonded thereto. The rubber member 13 is moulded and bonded to the two metal rings in one operation. The integral portion 21 performs an important function. As shown, it is so moulded as to extend radially inwardly of the inner edge of the flange 20 and the extending part is cut to form a ridge of V-shaped cross section to thereby establish a sealing lip 22 for engaging with the surface of a shaft S, indicated by dashed lines. This sealing lip edge is toward the inner side of the seal and acts to provide a first sealing action with the shaft. Other shaft sealing lips of the seal will now be described.

Within the inner metal ring 19 is mounted two bearing rings 23 and 24 made from suitable metal to withstand wear. Each ring has an inner diameter to fit on the shaft and easily ride thereon as the shaft rotates. The bearing ring 23 is shown as adjacent the leg 20 and between the rings is a rubber sealing member 25 in the form of a relatively thin washer. This sealing washer has an outer diameter to fit in the ring member 18 and an inner diameter somewhat smaller than the inner diameters of the two bearing rings to thus establish an extending rubber sealing lip engaging under pressure, by a flexing action, with the shaft surface.

Adjacent the outer side of bearing 24 is shown another sealing washer 26 which is identical with the washer 25 and it acts as another sealing member when it is desired to have such additional sealing action besides that of washer 25 and the sealing lip 22. Outwardly of the second rubber sealing washer is a metal washer 27 having an internal diameter the same size as the bearing rings and acting on the metal washer is a spring ring 28 (shown slightly thicker than actual construction) which is so constructed that its periphery can snap into a small annular groove adjacent the outer end of the cylindrical leg of metal ring 18.

The spring is a very important feature of the seal and is so built that when in operative position it will act to apply an axial pressure on the two rubber sealing washers 26 and 25. This pressure is great enough to cause the rubber material to flow and since the washers are confined between the bearing rings, the metal washer and the cylindrical leg of the metal ring 18, all as shown, there will be no place for the rubber to flow except in an inward radial direction toward the shaft surface. The result will be that when the seal is mounted on a shaft, the inner portions of the sealing washers which extend beyond the bearing rings will be pushed radially outward by the shaft surface and this pushing will be opposed by the axial force applied by the side spring. Consequently, the sealing lips of the washers will have a good sealing pressure with the shaft surface and as these lips wear, the sealing pressure nevertheless will be maintained by the spring since it will continuously apply side pressure to the rubber washer and cause a rubber flow toward the shaft.

Any wear on the lips of the sealing washers will be uniform, due to the bearing rings associated therewith and the thin middle section 16 of the rubber web 13. The bearing rings will ride on the shaft and consequently follow any eccentric movement of the shaft. The bearing rings and the metal ring 18 will move easily with respect to the support ring as the thin section 16 can easily flex. With the bearing rings and metal ring 18 following shaft movement and with the sealing washers and also sealing lip 22 all mounted to move with these members, any eccentric movement of the shaft will assure there will be substantially uniform pressure of the sealing lips on the shaft. There will be little or no eccentric wear. If more sealing washers are desired, they can be added to increase the number of sealing lips of my improved seal. There also should be additional bearing rings as each washer should have at least one bearing ring adjacent thereto.

Figure 3:
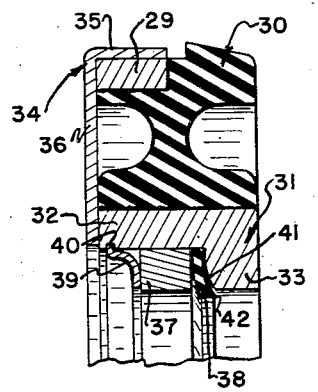
Figure 3 is a radial sectional view showing a modified seal construction in which my invention is embodied.

In Figure 3 I have disclosed another seal construction which can be considered as a modified structure of the seal disclosed in Figures 1 and 2. In this seal there is a support ring 29 and a rubber web member 30 bonded thereto, this rubber web member being substantially the same as the previously described member 13 of the Figure 1 seal and the details thereof need not be described. Its inner portion is bonded to a bearing ring member 31 of L-shaped cross section having the cylindrical leg portion 32 and a flange leg portion 33 which is to ride upon the shaft. The rubber web member 30 is not bonded alongside of the leg 33 as in the seal of Figure 1, but such could be done if desired to have a sealing lip on the inner side of the seal to correspond with the sealing lip 22 of the Figure 1 seal.

In addition to the support ring 29, I also employ a backing ring 34, such having a cylindrical portion 35 which is arranged to surround the supporting ring 29, said supporting ring being press fitted into this cylindrical portion of the backing ring. The backing ring also has the inwardly extending flange portion 36 which is arranged to extend a sufficient distance inwardly to act as a backing for the outer side of the bearing ring 31, that is, an abutment which can be engaged by the cylindrical leg 32 of said bearing ring. The purpose of this bearing ring will become apparent.

Mounted within the cylindrical leg of the bearing ring is a second bearing ring 37 which is of such internal diameter as to also ride on the shaft. Between this bearing ring 37 and the leg 33 of the bearing ring 31 is a rubber sealing washer 38 having such internal diameter as to extend slightly inwardly beyond the inner surfaces of the bearing ring 37 and the leg 33 of bearing ring 31. The rubber washer will be compressed between the two bearing rings by an annular spring 39 which can snap into a groove 40 in the leg 32 of the bearing ring 31. The spring will apply pressure to the sides of the rubber washer and cause it to flow toward the shaft as this is the only point which is unconfined.

A feature of this modified seal is the provision of a curved surface on the inside of the leg 33 of the bearing ring, that is, the surface which is adjacent the rubber washer 38. This curved surface is indicated at 41. With this curved surface, the washer can be flexed toward the inside of the seal and to provide a proper sealing lip for the inner part of the rubber washer, the inner edge will be trimmed so that a V ridge 42 will be established on the side of the washer toward the inner side of the seal.

When the seal of Figure 3 is mounted on a shaft, the sealing lip 41 will be toward the inner side of the seal and a good sealing action will be maintained with the shaft surface. This seal just described is particularly useful where there are relatively high pressures to be sealed as it is provided with the backing ring 34 and, as can readily be seen with this backing ring, any high pressures acting on the inside of the seal, that is, the right hand side of the seal as viewed in Figure 3, will not be capable of pushing the inner bearing ring 31 axially to the left with respect to the supporting ring and thus cause the inner part of the seal which operates with the shaft to become "cocked" or otherwise pull out of line on the shaft, which could readily cause non-uniform wear and resultant leakage. It will be noted that the seal of Figure 3 is a full floating seal and it can be "press fitted" into the bore of a housing surrounding the shaft. There will be no appreciable eccentric wear on the sealing washer as this will be prevented by the bearing leg 33 riding on the shaft and also the bearing ring 37 which provides for bearing rings on both sides of the sealing washer. Furthermore, with the type of sealing lip shown, high pressures can be sealed without any excessively high pressures being produced by the spring 39. One feature of this seal which is to be particularly noted is the lip and bearing ring construction formed by the flange 33. The curved surface of this flange can be varied, as desired, and thereby control the build-up pressure on the sealing lip and through the sealing washer on the side spring as a reacting pressure. By decreasing the amount of curvature, the area of the seal which can be acted on by any fluid pressure can be decreased. If desired, the entire curvature can be eliminated and a straight wall provided where the fluid pressure to be acting on the seal is to be a minimum.

Figure 4:
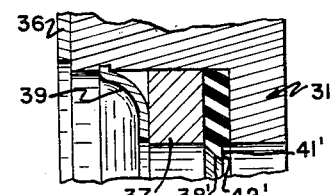
Figure 4 is a sectional view showing a slightly different sealing lip construction for the seal of Figure 2.

In Figure 4 a slightly different construction of sealing washer is provided and it can, if desired, take the place of the sealing washer 38 of Figure 3. In the modification of Figure 4, the bearing ring 31 is constructed so there is no curved surface on the bearing leg thereof. The sealing washer 38' will be confined between the bearing leg of the bearing ring 31 and the bearing ring 37 and this sealing washer will be under pressure by the spring 39, as already described in connection with the seal of Figure 3. The sealing washer 38' has an inner portion which extends beyond the inner surfaces of the bearing leg of the bearing ring 31 and the bearing ring 37. This extending inner portion is cut to provide an annular V ridge 42', the inside of which will be substantially at right angles to the axis of the bearing and the outside will extend from the apex of the ridge at an angle of about 15 degrees with the front surface and then, if desired, at a greater angle farther back. The operation of the seal of Figure 4 will be substantially the same as the seal of Figure 3. The ridge or lip 41' will ride on the shaft and when the seal is operating the lip will be flexed toward the inner side of the seal. In this construction the particular sealing lip will permit good sealing action with low spring pressure, due to the readily yieldable V-shaped lip edge.

Figure 5:
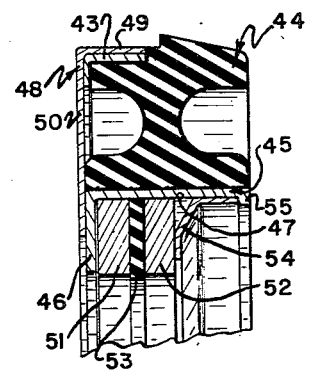
Figure 5 is a radial sectional view of still another modification.

In Figure 5 another modified seal is shown which is somewhat similar to the seal shown in Figures 1 and 3 and is particularly designed for sealing relatively high pressures. In this Figure 5 seal there is a support ring 43 and a rubber web member 44 bonded to the supporting ring and also bonded to an L-shaped metal ring 45 which is similar to the ring 18 of the seal of Figure 1, but reversed so the leg portion 46 is on the outer side of the seal. The rubber web member is bonded only to the cylindrical leg portion 47 of the ring 44. The seal of Figure 5 also has a backing ring 48 which has a cylindrical portion 49 receiving the supporting ring. The inwardly extending flange portion 50 of the backing ring projects a sufficient distance to extend alongside the leg 46 of the ring 45 and thus will prevent the shifting of the inner portion of the seal to the left relatively to the support ring 43 and the resulting tendency to "cock" or otherwise pull out of line.

Within the metal ring 45 are two metal bearings 51 and 52 and interposed between these bearing rings is a rubber washer 53 which is capable of extending slightly inwardly beyond the inner surfaces of the two bearing rings which will ride on the shaft. An annular spring 54 will be employed to apply pressure to the bearing ring 52 and through it onto the sides of the rubber sealing washer, with the result that the sealing washer will tend to flow radially inwardly and engage the shaft with pressure. As wear takes place there will be flow to take up the wear. The spring can be held in its pressure applying position by ring 45 by turning over an edge 55 of this ring.

From a description of the seals of Figures 1 and 3, it will be apparent how this seal structure of Figure 5 functions. It will, however, be noted the seal is capable of being pressed into a housing bore, due to the beveled outer surface on the web member. The seal will be full floating and any high pressures developed on the inner side of the seal will not cause the inner portion of the seal, including the bearing rings and sealing washer, to have a "cocking" pressure as this whole assembly cannot be pushed axially to the left with respect to the bearing ring. The action of the spring 54 in causing the sealing washer to function in the desired manner has already been described in connection with the seal of Figure 1.

It is to be noted that I have disclosed that part of my improved seal structure which cooperates with a shaft as being embodied in a seal of the floating type, but the sealing washer and the manner in which one or more thereof are associated with a bearing ring or bearing rings and acted upon by a side acting spring to produce a flow of the rubber or other material all can be embodied in a more rigid type of seal which is not intended to have the floating action. It is further to be noted that with the particular arrangement of bearing ring and sealing member or washer, there will be only a small area on the sealing washer which can be acted upon by fluid pressure which is being sealed. The bearing ring has a close fit on the shaft and with the sealing lip or edge of the sealing washer having sealing action with the shaft, the only area which will be exposed to fluid pressure will be that area at the opening between the shaft and bearing ring. This is particularly true when the bearing ring is on the side of the seal which is acted upon by fluid pressure. With this small area only being acted on, the spring pressure will not be restricted by any appreciable counter force from fluid pressure. In the event the seal should be constructed so as to be reversed, that is, with the bearing ring on the side opposite that of the fluid pressure being sealed, then the area of the sealing element which is subjected to fluid will also be small, but this pressure will also aid the compressing action of the spring and thus it will be possible to make the spring somewhat weaker to bring about the desired flow to take up the wear on the sealing edge of the sealing washer.

In producing a seal embodying my invention, the pressure acting on the sealing element to bring about a flow of material can be controlled as circumstances require. This control can be obtained in several ways, amongst which is the spring strength to be selected and the particular hardness of the rubber or synthetic rubber from which the sealing washer is made. If the rubber material is to be relatively hard, then greater spring tension can be employed without increasing the pressure of the sealing edge on the shaft and causing any excessive wear at the sealing lip.

The thickness of the sealing washer is to be relatively small. This is particularly true when the cylindrical sealing edge or lip is to be employed as shown in Figures 1 and 5. The thickness of the sealing washer in such instances may be between 0.15 inch and 0.50 inch. When a tapered, knife edge or V-type of sealing edge is employed, such as in the seals of Figures 3 and 4, then the thickness of the sealing element may be somewhat thicker as in these forms the sealing edge is relatively flexible near the apex and the desired flow to take up wear can be small. In all the seals shown there is only one sealing washer being compressed between the two relatively rigid members, at least one of which will be a bearing ring. However, more than one sealing member between these relatively rigid members can be employed if such is found desirable.

Being aware of further modifications of seals particularly described, all without departing from the fundamental principles of my invention, I desire it to be understood that the scope of my invention is not to be limited except in accordance with the appended claims.

What is claimed is:

1. A seal for association with two relatively rotatable members having concentric cylindrical surfaces, said seal having an annular outer portion for mounting in the outer of the concentric cylindrical surfaces and an annular inner portion; a bearing ring of rigid wear-resisting material carried by the inner portion of the seal having an inner diameter to ride on the inner of the concentric cylindrical surfaces and having an outer periphery; a sealing member of flowable material positioned adjacent one side of the bearing ring, having an outer periphery and having an inner sealing edge to engage the inner of the concentric cylindrical surfaces, with said edge having a normal diameter slightly less than the inner diameter of the bearing ring; a rigid annulus carried by the inner portion of said seal and having an axially extending portion around and in engagement with the outer peripheries of said bearing ring and sealing member; means for applying an axial force acting on the opposite side of the sealing member from said bearing ring, said sealing member being so confined between said bearing ring on one radial side, said means for applying axial force on the other radial side, and said rigid axially extending annulus on its outer periphery that the axial force causes a flow of its material toward the inner of the concentric surfaces with which its sealing edge is to engage; and means carried by the annular inner portion of the seal and comprising yieldable material secured to said annulus and provided with a sealing edge for engaging the inner of the concentric cylindrical surfaces.

2. A seal for association with two relatively rotatable members having concentric cylindrical surfaces, said seal having an annular outer portion for mounting in the outer of the concentric cylindrical surfaces and an inner annular portion, a rigid member secured to the inner annular portion and provided with an axial leg and a radially inwardly extending annular leg, a bearing ring of wear resistant material positioned in the rigid member adjacent its radially inwardly extending leg and having an inner diameter which is adapted to ride on the inner of the concentric cylindrical surfaces, a sealing member of flowable material positioned adjacent the bearing ring and having an inner sealing edge to engage the inner of the concentric cylindrical surfaces with said edge having a normal diameter slightly less than the inner diameter of the bearing ring, and means comprising a spring carried by the rigid member for applying an axial force on the side of the sealing member opposite the bearing ring, said sealing member having an outer edge which engages the axial leg of said rigid member, whereby said sealing member is confined against flow of its material radially outwardly.

3. A seal for association with two relatively rotatable members having concentric cylindrical surfaces, said seal having an annular outer portion for mounting in the outer of the concentric cylindrical surfaces and an inner annular portion, a rigid member secured to the inner annular portion and provided with an axial portion and a radially inwardly extending annular leg, a bearing ring of wear-resistant material positioned in the rigid member adjacent its radially inwardly extending leg and having an inner diameter which is adapted to ride on the inner of the concentric cylindrical surfaces, a sealing member of flowable material positioned adjacent the bearing ring and having an outer edge and an inner sealing edge to engage the inner of the concentric cylindrical surfaces with said inner sealing edge having a normal diameter slightly less than the inner diameter of the bearing ring, means comprising a spring carried by the rigid member for applying an axial force on the side of the sealing member opposite the bearing ring, the outer edge of said sealing member engaging the axial leg of said rigid member, whereby said sealing member is confined against flow of its material radially outwardly, and a second sealing member secured to the radially inwardly extending leg on the side opposite said bearing ring and having a sealing lip extending radially inwardly for sealing engagement with the inner of the concentric cylindrical surfaces.

4. A seal for association with two relatively rotatable members having concentric cylindrical surfaces, said seal having an annular outer portion for mounting in the outer of the concentric cylindrical surfaces and an inner annular portion, a rigid member secured to the inner annular portion and provided with an axial leg and a radially inwardly extending annular leg, a bearing ring of wear-resistant material positioned in the rigid member adjacent its radially inwardly extending leg and having an inner diameter which is adapted to ride on the inner of the concentric cylindrical surfaces, a first sealing member of flowable material positioned adjacent the bearing ring and having an outer edge engaging said axial leg and an inner sealing edge to engage the inner of the concentric cylindrical surfaces, and a second sealing member secured to the radially inwardly extending leg on the opposite side thereof from said bearing ring and having a sealing lip extending radially inwardly for sealing engagement with the inner of the concentric cylindrical surfaces.

5. A seal for association with two relatively rotatable members having concentric cylindrical surfaces, said seal including a member of yieldable material having an annular outer portion for mounting in the outer of the concentric cylindrical surfaces and an inner annular portion connected in spaced relation to said outer portion by a web portion, a supporting ring to which said annular outer portion is bonded and providing with said portion a yieldable press fit in the outer of the concentric cylindrical surfaces, a bearing ring of wear-resistant material carried by the inner annular portion and having as inner diameter which is adapted to ride on the inner of the concentric cylindrical surfaces, a sealing member of flowable material positioned adjacent the bearing ring and having an outer edge and an inner sealing edge to engage the inner of the concentric cylindrical surfaces, said inner edge having a normal diameter slightly less than the inner diameter of the bearing ring, means comprising a spring for applying an axial force on the side of the sealing member opposite the bearing ring, and a rigid member carried by said annular inner portion against which the outer edge of said sealing member bears and by which along with said bearing ring and said last named means, it is confined against flow of its material radially outwardly.

6. A seal for association with two relatively rotatable members having concentric cylindrical surfaces, said seal comprising a member of yieldable material having an outer annular portion for mounting in the outer concentric cylindrical surface and an inner annular portion with a relatively thin connecting flexible web portion, a rigid member secured to the inner portion and having a cylindrical portion of greater diameter than the inner concentric cylindrical surface, a bearing member carried by the rigid member and arranged to ride on the inner concentric surface, a relatively thin sealing washer of flowable material positioned adjacent the bearing member and having opposite sides, an outer periphery, and an inner periphery normally slightly less than that of the inner concentric surface, and means including said bearing member for applying opposing axial forces against the sides of the sealing washer, the outer periphery of said sealing washer being in contact with said rigid member and being confined thereby and by said means for applying opposing axial forces, against flow except in the direction toward the axis of the seal.

7. The seal of claim 6 having in addition an annular support ring of rigid material secured to said outer portion and having an outer periphery that fits into said outer concentric cylindrical surface, and means carried by said support ring and extending radially inwardly therefrom to provide an abutment for preventing axial movement of the inner annular portion of the seal relatively to the outer annular portion of the seal without restraining relative radial movement.

8. The seal of claim 7 wherein the outer annular portion of the yieldable member has a part of its material axially adjacent the support ring, said outer annular portion being provided with a peripheral surface inclined to the axis of the seal with its greatest diameter being adjacent the support ring and of a diameter slightly greater than the outer diameter of the support ring.

9. The seal of claim 7 wherein the inner annular portion of said yieldable member has a sealing lip on one side of said seal in engagement with said inner concentric surface, said sealing lip defining a tapered ridge.

10. A seal for association with two relatively rotatable members having substantially concentric cylindrical surfaces, said seal comprising a member of yieldable material having an outer annular portion for mounting in the outer concentric cylindrical surface and an inner annular portion with a relatively thin connecting flexible web portion, a rigid outer support ring having substantially the same diameter as the outer of the concentric surfaces and of slightly less diameter than the outer annular portion of the yieldable member and bonded thereto, a rigid member secured to the inner portion and having a cylindrical portion of greater diameter than the inner concentric cylindrical surface, a bearing member carried by the rigid member and arranged to ride on the inner concentric surface, a relatively thin sealing washer of flowable material positioned adjacent the bearing member and having sides, an outer periphery, and an inner periphery normally slightly less than that of the inner concentric surface, and means including said bearing member for applying opposing axial forces to the opposite sides of the sealing washer, said sealing washer being confined against flow except in the direction toward the axis of the seal by its outer periphery lying against said rigid member and by its sides lying between said means for applying opposing axial forces.

11. A seal for association with two relatively rotatable members having concentric cylindrical surfaces, said seal comprising a member of yieldable material having an outer annular portion for mounting in the outer concentric cylindrical surface and an inner annular portion with a relatively thin connecting flexible web portion, a rigid member secured to the inner portion and having a cylindrical portion of greater diameter than the inner concentric cylindrical surface, a bearing member carried by the rigid member and arranged to ride on the inner concentric surface, a relatively thin sealing washer of flowable material positioned adjacent the bearing member and having an outer periphery abutting said rigid member and an inner periphery normally slightly less than that of the inner concentric surface, and means including a spring element and said bearing member for applying opposing axial forces to the sides of the sealing washer, said sealing washer being confined against flow except in the direction toward the axis of the seal by said means for applying opposing axial forces and by its outer periphery abutting said rigid member.

12. A seal for association with two relatively rotatable members having concentric cylindrical surfaces, said seal comprising a member of yieldable material having an outer annular portion with a support portion of less diameter for manual press fit mounting in the outer concentric cylindrical surface and an inner annular portion with a relatively thin connecting flexible web portion, a rigid member secured to the inner portion and having a cylindrical portion of greater diameter than the inner concentric cylindrical surface and a radially inwardly extending flange portion, a bearing member carried by the rigid member adjacent the flange portion and arranged to ride on the inner concentric surface, a relatively thin sealing washer of flowable material positioned with one side adjacent one side of the bearing member and having an outer periphery and an inner periphery normally slightly less than that of the inner concentric surface, and means for applying an axial force to the side of the sealing washer opposite the bearing member, said sealing washer being confined against flow except in the direction toward the axis of the seal by having its outer periphery bear against said rigid member and by its sides lying between said means and said bearing member.

13. A seal for association with two relatively rotatable members having concentric cylindrical surfaces, said seal comprising a member of yieldable material, having an outer annular portion with a support portion of less diameter for manual press fit mounting in the outer concentric cylindrical surface and an inner annular portion with a relatively thin connecting flexible web portion, a rigid member secured to the inner portion and having a cylindrical portion of greater diameter than the inner concentric cylindrical surface and a radially inwardly extending flange portion, a bearing member carried by the rigid member adjacent the flange portion and arranged to ride on the inner concentric surface, a relatively thin sealing washer of flowable material positioned adjacent one side of the bearing member and having an outer periphery and an inner periphery normally slightly less than that of the inner concentric surface, means for applying an axial force to the side of the sealing washer opposite the bearing member, the outer periphery of said sealing washer abutting said rigid member and being confined thereby and by said bearing member and said means against flow except in the direction toward the axis of the seal, and another seal of flowable material secured to the said flange portion on the side opposite the bearing member and having an annular sealing edge for engagement with the inner of the concentric cylindrical surfaces.

References Cited in the file of this patent

UNITED STATES PATENTS

| | | |
|---|---|---|
| 1,224,449 | Dean | May 1, 1917 |
| 1,354,003 | Richard | Sept. 28, 1920 |
| 1,369,508 | Weiner et al. | Feb. 22, 1921 |
| 1,486,060 | Trautner | Mar. 4, 1924 |
| 2,245,474 | Hately | June 10, 1941 |
| 2,434,686 | Clayton-Wright | Jan. 20, 1948 |
| 2,480,513 | Schnuck | Aug. 30, 1949 |
| 2,570,098 | Carlstedt | Oct. 2, 1951 |
| 2,573,735 | Sanford et al. | Nov. 6, 1951 |

FOREIGN PATENTS

| | | |
|---|---|---|
| 556,441 | Great Britain | Oct. 5, 1943 |
| 621,526 | Great Britain | Apr. 11, 1949 |